(12) United States Patent
Chen et al.

(10) Patent No.: US 11,990,840 B2
(45) Date of Patent: May 21, 2024

(54) LLC CONTROLLER AND CONTROL METHOD FOR POWER CONVERTER

(71) Applicant: Leadtrend Technology Corporation, Zhubei (TW)

(72) Inventors: Yao-Tsung Chen, Zhubei (TW); Kuan-Hsien Chou, Zhubei (TW)

(73) Assignee: LEADTREND TECHNOLOGY CORPORATION, Zhubei (TW)

(*) Notice: Subject to any disclaimer, the term of this patent is extended or adjusted under 35 U.S.C. 154(b) by 195 days.

(21) Appl. No.: 17/840,864

(22) Filed: Jun. 15, 2022

(65) Prior Publication Data

US 2023/0147857 A1   May 11, 2023

(30) Foreign Application Priority Data

Nov. 10, 2021   (TW) .................................. 110141881

(51) Int. Cl.
*H02M 3/335* (2006.01)
*H02H 7/12* (2006.01)
*H02M 1/00* (2006.01)
*H02M 3/00* (2006.01)
*H02M 3/24* (2006.01)

(52) U.S. Cl.
CPC ............ *H02M 3/24* (2013.01); *H02H 7/1213* (2013.01); *H02M 1/0009* (2021.05); *H02M 3/01* (2021.05)

(58) Field of Classification Search
CPC ...... H02M 1/0009; H02M 1/32; H02M 1/325; H02M 3/01; H02M 3/335; H02M 3/33507; H02M 3/33569; H02M 3/33571
See application file for complete search history.

(56) References Cited

U.S. PATENT DOCUMENTS

| 9,548,652 B2* | 1/2017 | Cao ......................... H02M 1/32 |
| 2011/0292688 A1* | 12/2011 | Zhang .................... H02M 1/32 363/21.02 |
| 2013/0121037 A1* | 5/2013 | Peng ........................ H02H 7/10 363/21.03 |

* cited by examiner

*Primary Examiner* — Gary L Laxton
(74) *Attorney, Agent, or Firm* — McClure, Qualey & Rodack, LLP

(57) ABSTRACT

A control method is disclosed to prevent false triggering of over-current protection. A power converter comprises high-side and low-side switches connected in series between an input power line and a ground line, for driving a resonant circuit to resonate. The power converter includes a detector detecting the resonant circuit to provide a detection signal representing a magnitude of resonance in the resonant circuit. A duty cycle of one of the high-side and low-side switches is detected, and a threshold is determined in response to the duty cycle. An over-current protection is triggered based on the threshold and the detection signal. When the over-current protection is triggered, at least one of the high-side and low-side switches stops providing power to the resonant circuit, and the resonance subsides.

11 Claims, 6 Drawing Sheets

LLC CONTROLLER AND CONTROL METHOD FOR POWER CONVERTER

CROSS-REFERENCE TO RELATED APPLICATION

This application claims priority to and the benefit of Taiwan Application Series Number 110141881 filed on Nov. 10, 2021, which is incorporated by reference in its entirety.

BACKGROUND

The present disclosure relates generally to an LLC resonant power converter, and more particularly, to methods and apparatuses in use of an LLC resonant power converter with dual output power sources.

LLC resonant power converters are excellent among switching mode power supplies in view of power conversion efficiency. It is well known by the manufactures of switching mode power supplies that power switches are major devices that consume significant power when converting power. Theoretically, an LLC resonant converter can control two major power switches, including high-side and low-side switches, to perform ZVS (zero voltage switching), where ZVS refers to a technology that a switch is turned ON at about the moment when the voltage drop across the channel of the switch is 0V. The conduction loss of the high-side and low-side switches is expectedly to be minimized, and the power conversion efficiency is therefore excellent. LLC resonant power converters are particularly suitable for high power applications, those requiring power more than 100 W for example.

A single-output LLC resonant power converter, having a single output power source to supply power, usually employs symmetric pulse-width modulation (PWM) control, a technology in which the duty cycles of the high-side and low-side switches are substantially equal, or both are very close to 50%. Nevertheless, a dual-output LLC resonant power converter, having two output power sources to supply power to two different loads respectively for example, may use asymmetric PWM (APWM) control to regulate the two output power sources. The duty cycles of the high-side and low-side switches may correspond to the conditions of the loads supplied by the output power sources respectively. It is of great concern how to provide a variety of protections, such as over-current protection, over-load protection, etc., for a dual-output LLC resonant power converter under asymmetric PWM control

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

An APWM dual-output LLC resonant power converter is detailed as an example of the invention in this specification, but this invention is not limited to. The invention might be used in a power converter different from the APWM dual-output LLC resonant power converter.

An APWM dual-output LLC resonant power converter according to embodiments of the invention has an LLC controller controlling high-side and low-side switches. The LLC controller provides a threshold to determine whether at least one of the loads is too heavy, and whether to stop power conversion to provide OCP. The threshold changes in response to at least one of the duty cycles of the high-side and low-side power switches, to avoid false OCP triggering.

Figure 1:
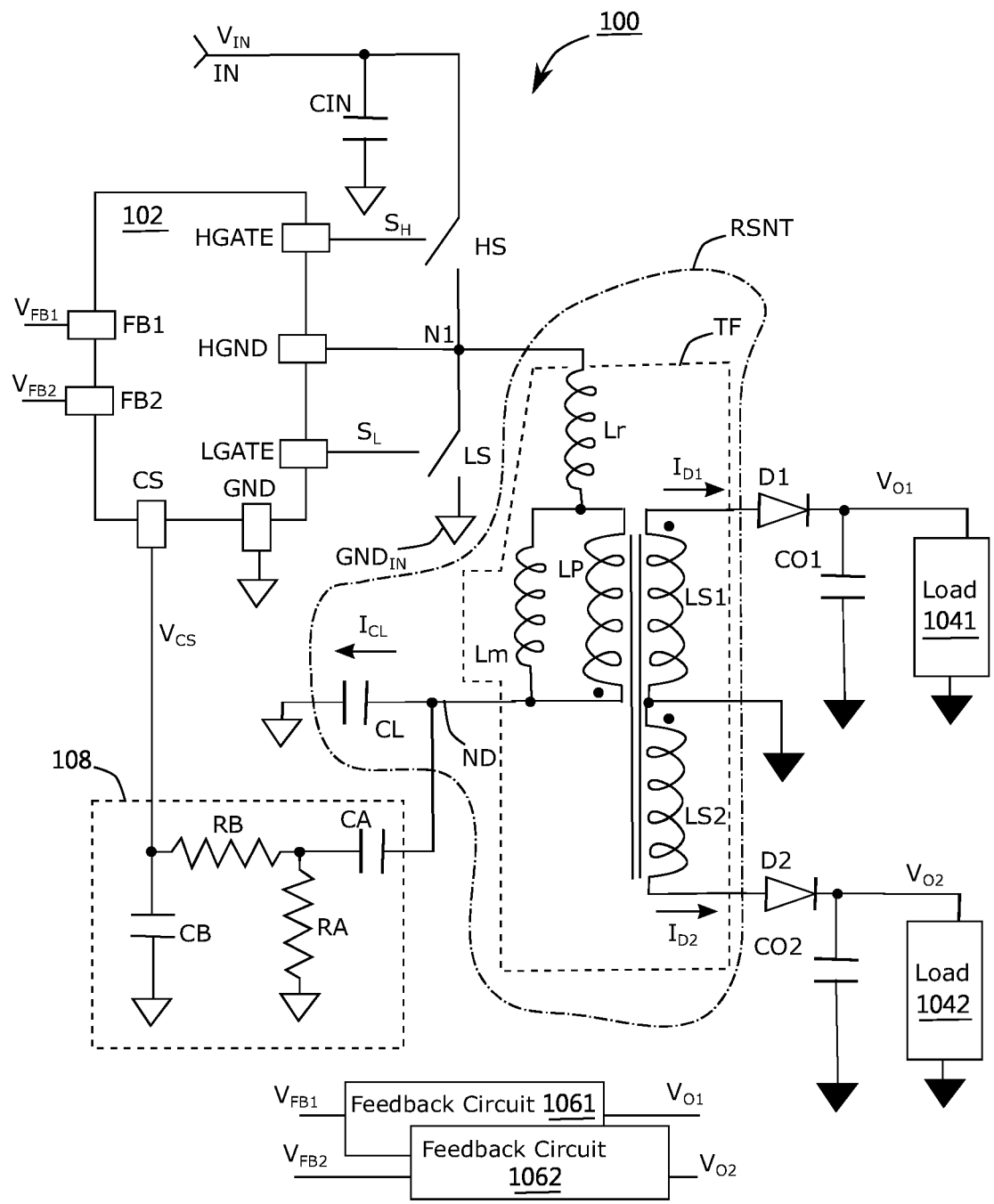
FIG. 1 demonstrates a dual-output LLC resonant power converter according to embodiments of the invention.

FIG. 1 demonstrates dual-output LLC resonant power converter 100 according to embodiments of the invention, converting input power source $V_{IN}$ at input power line IN into output power sources $V_{O1}$ and $V_{O2}$ to supply power to loads 1041 and 1042 respectively.

High-side switch HS and low-side switch LS, connected in series between input power line IN and input ground line $GND_{IN}$, drive resonant circuit RSNT to resonate, where resonant circuit RSNT has transformer TF and capacitor CL. Inside transformer TF, two secondary windings LS1 and LS2 are inductively coupled to primary winding LP, which is connected to inductors Lr and Lm. Inductors Lr and Lm refer to the leakage inductors connected in series to and in parallel with primary winding LP respectively. In FIG. 1, primary winding LP and capacitor CL are connected in series via node ND. Resonant circuit RSNT is not limited to the circuit shown in FIG. 1 and might have a different circuit in other embodiments of the invention.

When resonant circuit RSNT resonates, induced currents $I_{D1}$ and $I_{D2}$ from secondary windings LS1 and LS2 respectively can be rectified by diodes D1 and D2 to build up output power sources $V_{O1}$ and $V_{O2}$ over capacitors CO1 and CO2 respectively.

Monitoring output power sources $V_{O1}$ and $V_{O2}$, feedback circuits 1061 and 1062 provide feedback signals $V_{FB1}$ ad $V_{FB2}$ respectively. Based on feedback signals $V_{FB1}$ and $V_{FB2}$ at feedback nodes FB1 and FB2, LLC controller 102 generates high-side control signal $S_H$ and low-side control signal $S_L$ to control the ON times of high-side switch HS and low-side switch LS. An ON time of a switch means a time period when the switch is tuned ON to provide a short circuit connecting two nodes of the switch.

Dual-output LLC resonant power converter 100 has detector 108 composed of resistors RA, RB and capacitors CA, CB, connection of which is shown in FIG. 1. Detector 108 connects to node ND, detecting the voltage drop across capacitor CL in resonant circuit RSNT to provide current-sense signal $V_{CS}$. Current-sense signal $V_{CS}$ can represent a magnitude of resonance in resonant circuit RSNT. Current-sense signal $V_{CS}$ is just an example of a detection signal, and some embodiments of the invention might provide a detection signal different from current-sense signal $V_{CS}$ in FIG. 1.

Figure 2:
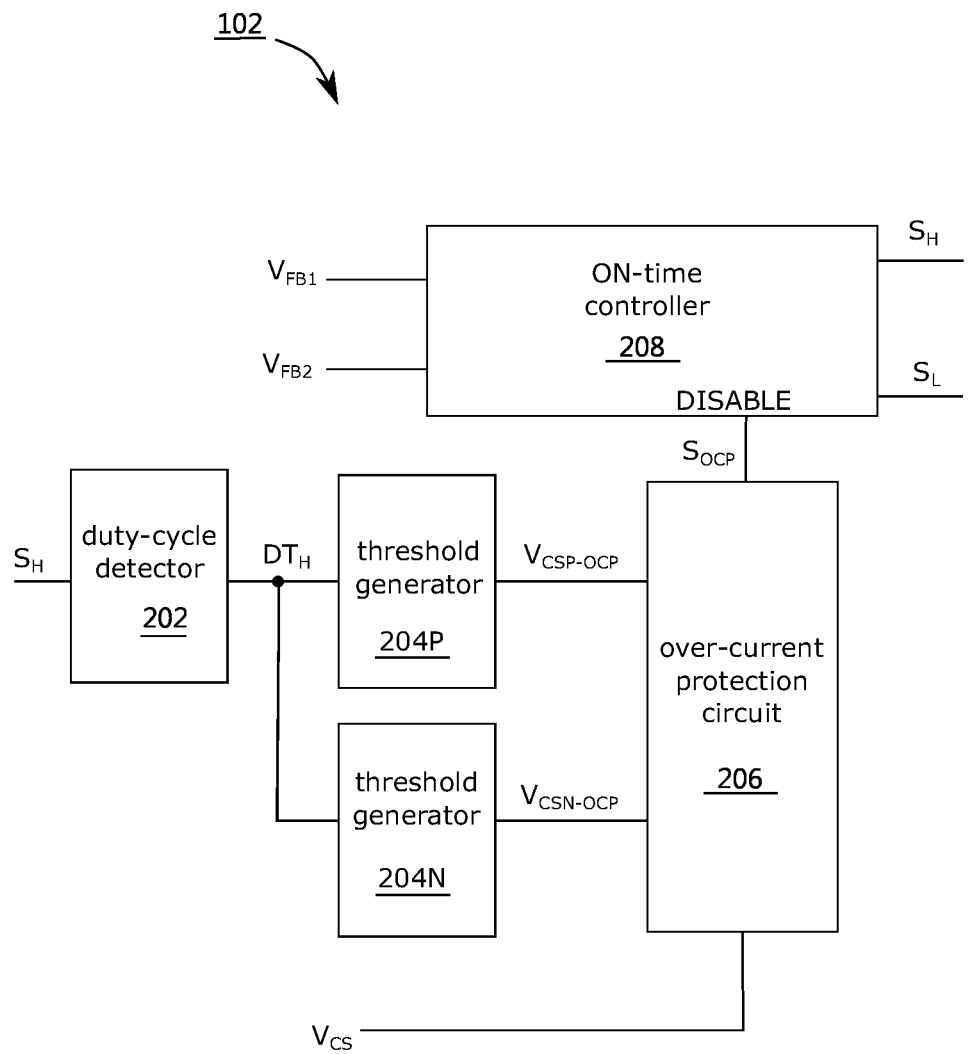
FIG. 2 shows an LLC controller according to embodiments of the invention.

FIG. 2 shows LLC controller 102 according to embodiments of the invention, including ON-time controller 208, duty-cycle detector 202, threshold generators 204P and 204N, and over-current protection circuit 206.

Based on feedback signals $V_{FB1}$ and $V_{FB2}$, ON-time controller 208 provides high-side control signal $S_H$ and low-side control signal $S_L$, to control high-side switch HS and low-side switch LS. ON-time controller 208 is also configured to make high-side switch HS and low-side switch LS perform ZVS, where each of high-side switch HS and low-side switch LS is turned ON when its channel voltage is about 0V.

In FIG. 2, duty-cycle detector 202 provides duty signal $DT_H$ based on high-side control signal $S_H$, representing the duty cycle of high-side switch HS, a number in the range of 0%-100%. Duty signal $DT_L$ represents the duty cycle of low-side switch LS, and can be derived from duty signal $DT_H$ in some embodiments of the invention, because they are basically complementary to each other. For example, if duty signal $DT_H$ is 35%, then duty signal $DT_L$ should be 65%, since the sum of duty signal $DT_H$ and duty signal $DT_L$ is about 100%. According to some embodiments of the invention, duty signal $DT_L$ can be directly obtained from low-side control signal $S_L$, based on the ratio of the ON time of low-side switch LS to the cycle time of low-side switch LS, and duty signal $DT_H$ can be derived from duty signal $DT_L$.

Figure 3A:
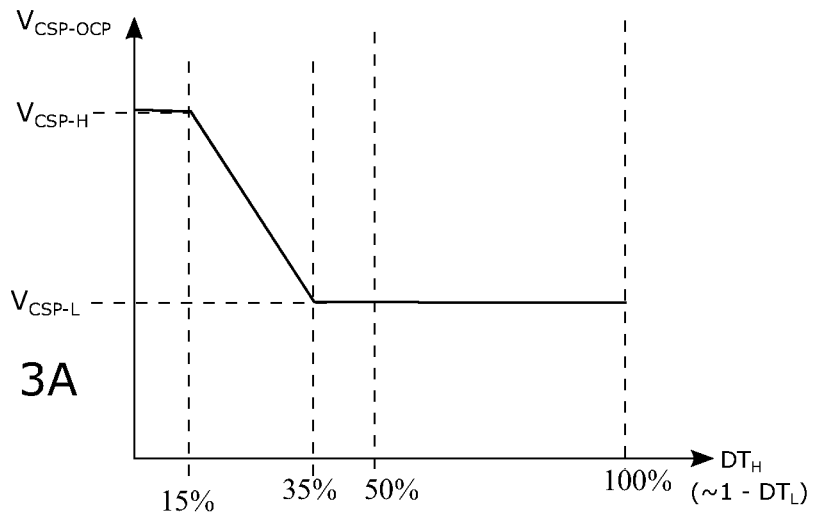
FIG. 3A demonstrates the relationship between threshold $V_{CSP-OCP}$ and duty signal $DT_H$ according to embodiments of the invention.
Figure 3B:
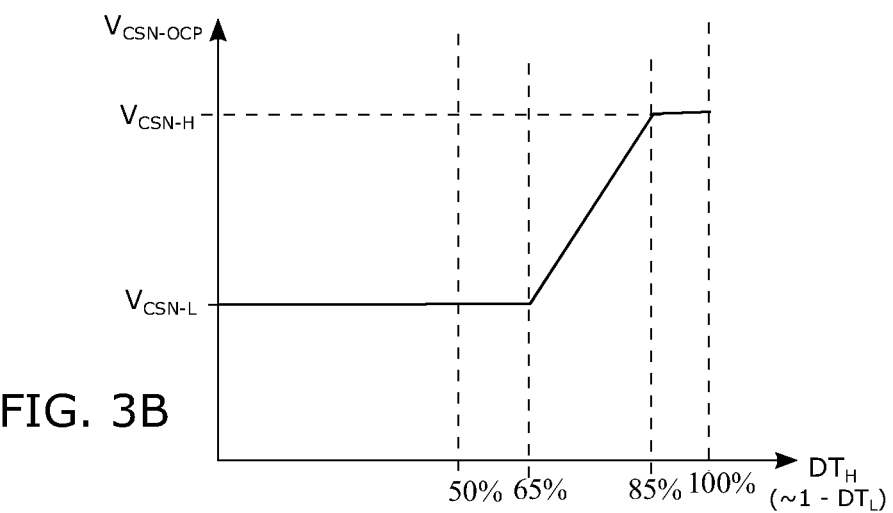
FIG. 3B demonstrates the relationship between threshold $V_{CSN-OCP}$ and duty signal $DT_H$ according to embodiments of the invention.

In FIG. 2, threshold generators 204P and 204N provide thresholds $V_{CSP-OCP}$ and $V_{CSN-OCP}$ respectively, both based on duty signal $DT_H$. The change of duty signal $DT_H$ may cause threshold $V_{CSP-OCP}$ and/or $V_{CSN-OCP}$ to change. FIG. 3A demonstrates the relationship between threshold $V_{CSP-OCP}$ and duty signal $DT_H$ according to embodiments of the invention. As shown in FIG. 3A, threshold $V_{CSP-OCP}$ is constant $V_{CSP-L}$ when duty signal $DT_H$ exceeds 35%, is constant $V_{CSP-H}$ when duty signal $DT_H$ is less than 15%, and varies linearly with the change of duty signal $DT_H$ when duty signal $DT_H$ is between 15% and 35%. Analogously, FIG. 3B demonstrates the relationship between threshold $V_{CSN-OCP}$ and duty signal $DT_H$ according to embodiments of the invention. As shown in FIG. 3B, threshold $V_{CSN-OCP}$ is constant $V_{CSN-H}$ when duty signal $DT_H$ exceeds 85%, is constant $V_{CSN-L}$ when duty signal $DT_H$ is less than 65%, and varies linearly with the change of duty signal $DT_H$ when duty signal $DT_H$ is between 65% and 85%. In an embodiment of the invention, all constants $V_{CSP-H}$, $V_{CSP-L}$ $V_{CSN-H}$, and $V_{CSN-L}$ are positive.

Some embodiments of the invention may provide thresholds $V_{CSP-OCP}$ and $V_{CSN-OCP}$ based on duty signal $DT_L$, which is about 100% minus duty signal $DT_H$, as indicated in FIGS. 3A and 3B.

Figure 4:
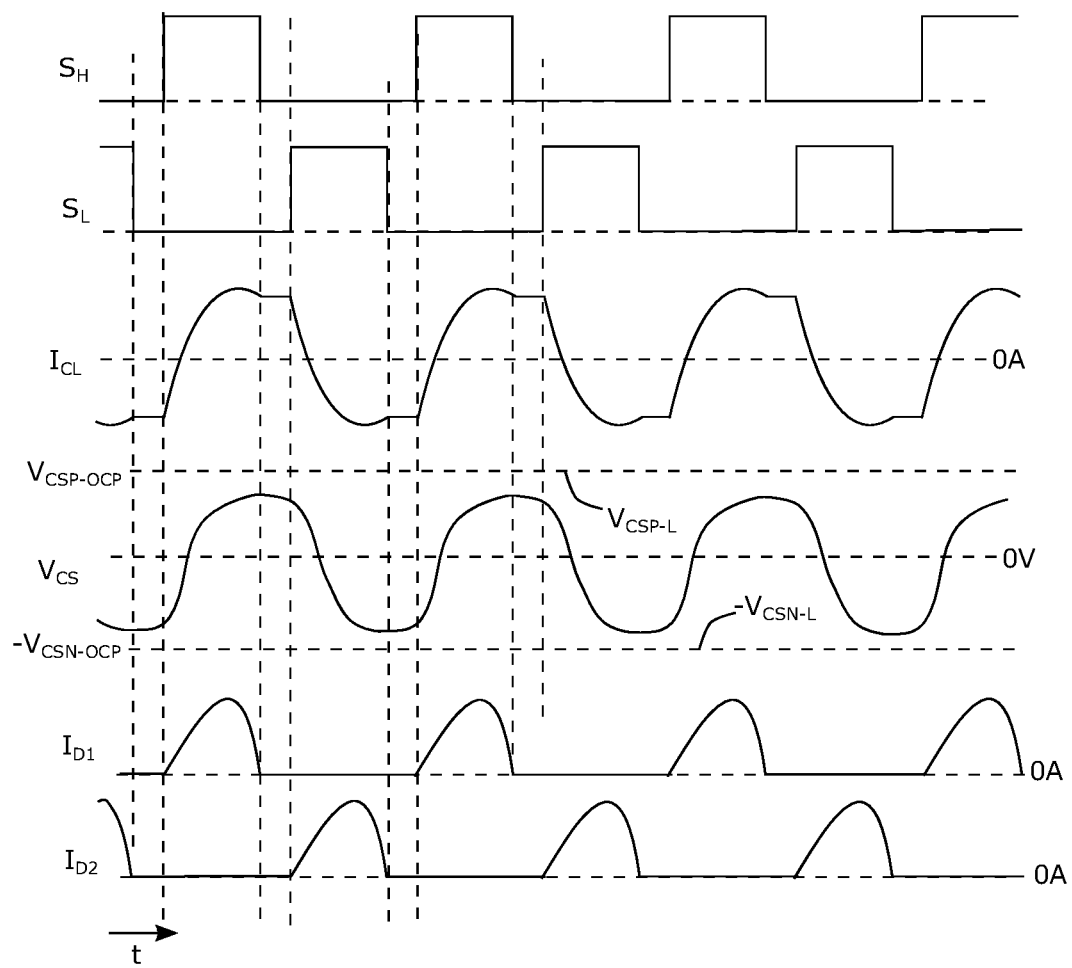
FIG. 4 demonstrates waveforms of signals in FIGS. 1 and 2 when each of the duty cycles of high-side switch HS and low-side switch LS is about 50%.

FIG. 4 demonstrates waveforms of signals in FIGS. 1 and 2 when each of the duty cycles of high-side switch HS and low-side switch LS is about 50%. From top to bottom, the waveforms in FIG. 4 are high-side control signal $S_H$, low-side control signal $S_L$, current $I_{CL}$ through capacitor CL, current-sense signal $V_{CS}$, and induced currents $I_{D1}$ and $I_{D2}$ through diodes D1 and D2 respectively. The waveforms in FIG. 4 might occur when for example both loads 1041 and 1042 are middle heavy.

If deadtimes between ON times of high-side switch HS and low-side switch LS are neglected, the waveforms of high-side control signal $S_H$ and low-side control signal $S_L$ in FIG. 4 indicate that each of the duty cycles of high-side switch HS and low-side switch LS is about 50%, duty signal $DT_H$ being about 50%. According to the relationships shown in FIGS. 3A and 3B, threshold $V_{CSP-OCP}$ in FIG. 4 is constant $V_{CSP-L}$, and threshold $V_{CSN-OCP}$ constant $V_{CSN-L}$.

Please refer to FIGS. 2 and 4. Over-current protection circuit 206 in FIG. 2 determines whether an OCP event occurs to output power sources $V_{O1}$ and $V_{O2}$ based on thresholds $V_{CSP-OCP}$, $V_{CSN-OCP}$ and current-sense signal $V_{CS}$ from detector 108, to trigger an over-current protection.

For example, if over-current protection circuit 206 finds that current-sense signal $V_{CS}$ has been exceeding threshold $V_{CSP-OCP}$ for a predetermined times within a predetermined time window, over-current protection circuit 206 determines that an OCP event is occurring to one of output power sources $V_{O1}$ and $V_{O2}$, so over-current protection is triggered. Similarly, over-current protection circuit 206 could determine that an OCP event is occurring to the other of output power sources $V_{O1}$ and $V_{O2}$ and triggers over-current protection if current-sense signal $V_{CS}$ has been below threshold $-V_{CSN-OCP}$ for the predetermined times within the predetermined time window.

In FIG. 4, current-sense signal $V_{CS}$ vibrates or varies within the acceptable range with borders of thresholds $V_{CSP-OCP}$ and $-V_{CSN-OCP}$. Consequentially, in view of the waveforms in FIG. 4, over-current protection circuit 206 will not deem an OCP event occurring and will not trigger over-current protection.

When over-current protection is triggered, over-current protection circuit 206 in FIG. 2 sends out protection signal $S_{OCP}$ to disable ON-time controller 208, which accordingly controls high-side switch HS and low-side switch LS to stop powering resonant circuit RSNT, so the resonance of resonant circuit RSNT subsides over time, and soon both output power sources $V_{O1}$ and $V_{O2}$ receive power no more from resonant circuit RSNT. The resonance of resonant circuit RSNT stops soon if at least one of high-side switch HS and low-side switch LS is kept turned OFF. Some embodiments of the invention might keep both high-side switch HS and low-side switch LS turned OFF when over-current protection is triggered. Other embodiments of the invention might keep one of high-side switch HS and low-side switch LS turned OFF and the other turned ON when over-current protection is triggered.

Figure 5:
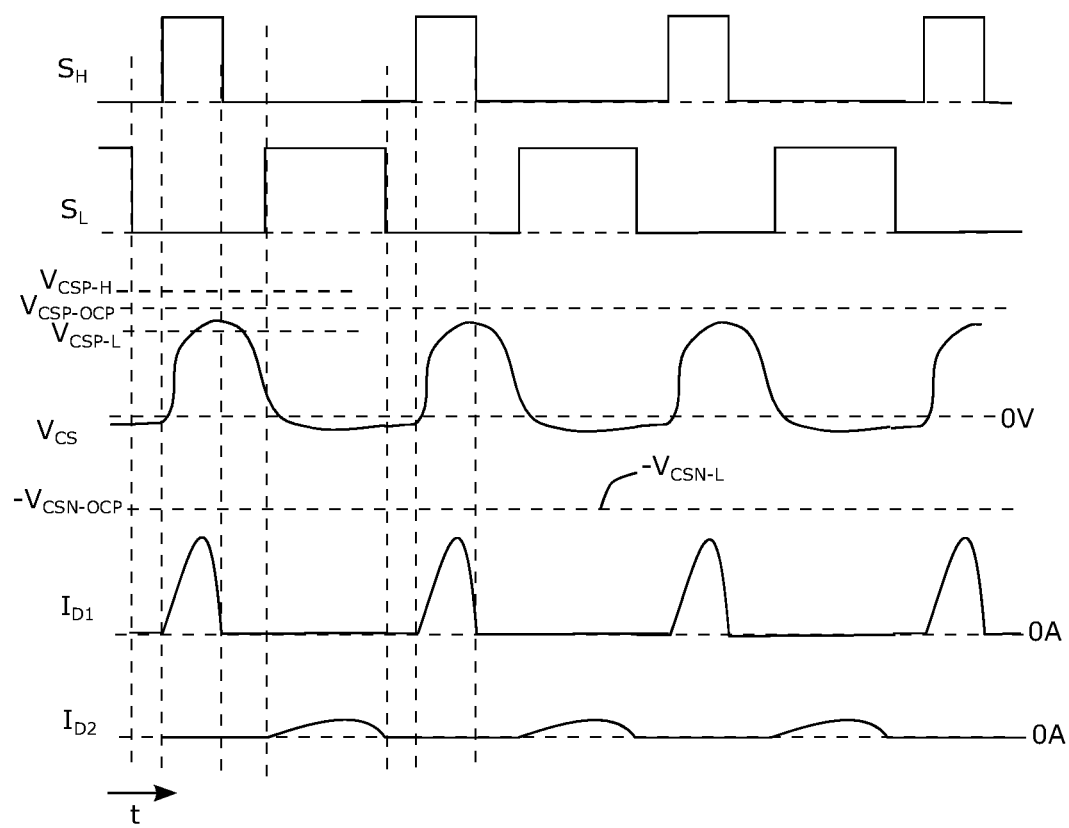
FIG. 5 demonstrates waveforms of signals in FIGS. 1 and 2 when the duty cycle of high-side switch HS, duty signal $DT_H$, is about 25%.

FIG. 5 demonstrates waveforms of signals in FIGS. 1 and 2 when the duty cycle of high-side switch HS, duty signal $DT_H$, is about 25%. Due to the complementary correlation, duty signal $DT_L$ is about 75% as duty signal $DT_H$ is about 25%. The waveforms in FIG. 5 might occur when for example load 1041 is middle heavy and load 1042 is light or absent. OCP should not be triggered in FIG. 5 because none of loads 1041 and 1042 is over heavy. Based on the relationship between threshold $V_{CSP-OCP}$ and duty signal $DT_H$ shown in FIG. 3A, threshold $V_{CSP-OCP}$ should be in the middle between constants $V_{CSP-H}$ and $V_{CSP-L}$. The acceptable range with borders of thresholds $V_{CSP-OCP}$ and $-V_{CSN-OCP}$ in FIG. 5 is extended now because it is wider than the one in FIG. 4. The acceptable range in FIG. 5 still covers the variation of current-sense signal $V_{CS}$, so over-current protection circuit 206 will not trigger over-current protection. The result that over-current protection is not triggered is correctly expected because none of loads 1041 and 1042 is over heavy.

Suppose that threshold $V_{CSP-OCP}$ in FIG. 5 is still constant $V_{CSP-L}$, the same as it is in FIG. 4. Even though none of loads 1041 and 1042 is over heavy, over-current protection will be, however, wrongly triggered because peaks of current-sense signal $V_{CS}$ exceed constant $V_{CSP-L}$ indeed in FIG. 5. In other words, the increasement to threshold $V_{CSP-OCP}$ based on FIG. 3A when duty signal $DT_H$ becomes below 35% can prevent false triggering of over-current protection. Similarly, the increasement to threshold $V_{CSN-OCP}$ based on FIG. 3B when duty signal $DT_H$ exceeds 65% can also prevent false triggering of over-current protection.

Over-current protection circuit 206 in FIG. 2 triggers OCP based on current-sense signal $V_{CS}$ and the acceptable range defined by the borders consisting of thresholds $V_{CSP-OCP}$ and $-V_{CSN-OCP}$. It is shown in FIGS. 3A and 3B that each of thresholds $V_{CSP-OCP}$ and $-V_{CSN-OCP}$ is constant, not changing with the change of duty signal $DT_H$ when duty signal $DT_H$ is within a central region from 35% to 65%, and that the acceptable range is a standard range from constant $-V_{CSN-L}$ to constant $V_{CSP-L}$. The acceptable range is extended, turning into an extended range covering the standard range when threshold $V_{CSP-OCP}$, a border of the acceptable range, increases as duty signal $DT_H$ leaves the central region and decreases below 35%, a boundary of the central region. The acceptable range is extended, turning into another extended range covering the standard range when threshold $-V_{CSN-OCP}$, another border of the acceptable range, decreases as duty signal $DT_H$ leaves the central region and increases over 65%, another boundary of the central region.

Figure 6:
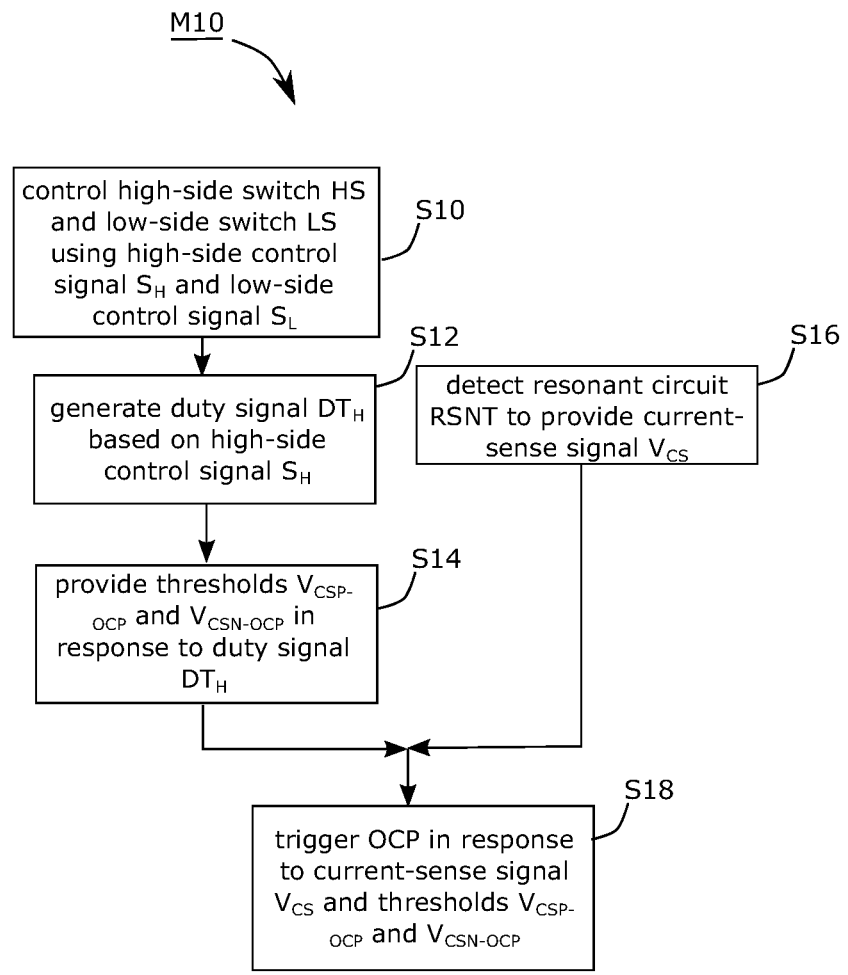
FIG. 6 demonstrates a control method in use of the dual-output LLC resonant power converter in FIG. 1.

FIG. 6 demonstrates control method M10 in use of dual-output LLC resonant power converter 100 in FIG. 1. Please refer to FIGS. 1, 2 and 6. In step S10, high-side control signal $S_H$ and low-side control signal $S_L$ are provided to control high-side switch HS and low-side switch LS, respectively. In step S12, duty-cycle detector 202 generates duty signal $DT_H$ representing the duty cycle of high-side switch HS, based on high-side control signal $S_H$. In step S14, threshold generators 204P and 204N provide thresholds $V_{CSP-OCP}$ and $V_{CSN-OCP}$ respectively, in response to duty signal $DT_H$. In step 16, detector 108 detects resonant circuit RSNT to provide current-sense signal $V_{CS}$. In step S18, over-current protection circuit 206 triggers over-current protection in response to current-sense signal $V_{CS}$, and thresholds $V_{CSP-OCP}$ and $V_{CSN-OCP}$.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method in use of a power converter comprising high-side and low-side switches connected in series between an input power line and a ground line, wherein the high-side and low-side switches are for driving a resonant circuit to resonate, and the power converter includes a detector detecting the resonant circuit to provide a detection signal representing a magnitude of resonance in the resonant circuit, the control method comprising:
   providing a high-side control signal and a low-side control signal to control the high-side and low-side switches respectively;
   detecting a duty cycle of one of the high-side and low-side switches;
   determining a threshold in response to the duty cycle; and
   triggering an over-current protection based on the threshold and the detection signal, wherein when the over-current protection is triggered, at least one of the high-side and low-side switches stops providing power to the resonant circuit, and the resonance subsides.

2. The control method as claimed in claim 1, further comprising:
   providing a first threshold and a second threshold in response to the duty cycle, to accordingly define an acceptable range; and
   triggering the over-current protection based on the acceptable range and the detection signal.

3. The control method as claimed in claim 2, further comprising:
   keeping the acceptable range constant when the duty cycle is within a central region containing 50%; and
   extending the acceptable range when the duty cycle is outside the central region.

4. The control method as claimed in claim 3, comprising:
   extending the acceptable range to be a first extended range when the duty cycle is more than a first boundary of the central region; and
   extending the acceptable range to be a second extended range different from the first extended region when the duty cycle is less than a second boundary of the central region.

5. The control method as claimed in claim 4, wherein the acceptable range has first and second borders, and the control method comprises:
   increasing the first border when the duty cycle is less than the first boundary; and
   decreasing the second border when the duty cycle is more than the second boundary.

6. The control method as claimed in claim 1, wherein the resonant circuit comprises a transformer and a capacitor both connected in series via a node, and the detector is connected to the node.

7. An LLC controller in use of an LLC unbalanced power converter comprising a resonant circuit, high-side and low-side switches connected in series, and a detector providing a detection signal capable of representing a magnitude of resonance in the resonant circuit, wherein the LLC controller controls the high-side and low-side switches, the LLC controller comprising:
- a duty-cycle detector, detecting a duty cycle of one of the high-side and low-side switches;
- a threshold generator providing a threshold in response to the duty cycle; and
- an over-current protector for triggering over-current protection based on the threshold and the detection signal, to stop providing power to the resonant circuit, and to let the resonance subside.

8. The LLC controller as claimed in claim 7, wherein the resonant circuit comprises a transformer and a capacitor both connected in series via a node, and the detector is connected to the node.

9. The LLC controller as claimed in claim 7, comprising:
- a first threshold generator for providing a first threshold in response to the duty cycle; and
- a second threshold generator for providing a second threshold in response to the duty cycle;

wherein the first and second thresholds define an acceptable range, and the over-current protector triggers the over-current protection based on the acceptable range and the detection signal.

10. The LLC controller as claimed in claim 9, wherein the first and second thresholds are constant when the duty cycle is within a central region containing 50%, and at least one of the first and second thresholds is changed when the duty cycle is outside the central region.

11. The LLC controller as claimed in claim 9, wherein the central region has first and second boundaries, the acceptable range has first and second borders defined by the first and second thresholds, the first threshold generator increases the first border when the duty cycle is less than the first boundary, and the second threshold generator decreases the second border when the duty cycle is more than the second boundary.

* * * * *